United States Patent
Bates et al.

(10) Patent No.: US 6,275,858 B1
(45) Date of Patent: *Aug. 14, 2001

(54) INTELLIGENT METHOD, APPARATUS AND COMPUTER PROGRAM PRODUCT FOR AUTOMATED REFRESHING OF INTERNET WEB PAGES

(75) Inventors: Cary Lee Bates; Paul Reuben Day, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/224,910

(22) Filed: Jan. 4, 1999

Related U.S. Application Data (62) Division of application No. 08/954,026, filed on Oct. 20, 1997, now Pat. No. 5,907,681.

(51) Int. Cl.⁷ .................................................... G06F 15/16
(52) U.S. Cl. .................... 709/228; 709/223; 709/224; 709/225; 709/226; 709/227
(58) Field of Search ..................................... 709/223–228

(56) References Cited

U.S. PATENT DOCUMENTS

| | | |
|---|---|---|
| 5,262,875 | 11/1993 | Mincer et al. . |
| 5,408,448 | 4/1995 | Carman . |
| 5,414,455 | 5/1995 | Hooper et al. . |
| 5,583,561 | 12/1996 | Baker et al. . |
| 5,583,868 | 12/1996 | Rashid et al. . |
| 5,602,582 | 2/1997 | Wanderscheid et al. . |
| 5,602,992 | 2/1997 | Danneels . |
| 5,623,699 | 4/1997 | Blakeslee . |
| 5,778,367 * | 7/1998 | Wesinger, Jr. et al. ................ 707/10 |
| 5,907,681 * | 5/1999 | Bates et al. ........................... 709/228 |
| 6,032,182 * | 2/2000 | Mullen-Schultz .................... 709/223 |

OTHER PUBLICATIONS

WWW Access by Proactively Controlled Caching Proxy Server, Doi (Sharp. Tech. J. No. 66, Sharp Co. pp. 73–76, 12/96) and English translation.

The Music Web Page Chat (http://www.professionals.com/~peterc/cgi/chat.cgi).

* cited by examiner

*Primary Examiner*—Zarni Maung
*Assistant Examiner*—Nabil El-Hady
(74) *Attorney, Agent, or Firm*—Joan Pennington (57) ABSTRACT

An intelligent method, apparatus and computer program product are provided for automated refreshing of internet web pages. Page data are stored including a record of page data values for each user selected internet web page. The page data values include at least one refresh interval, a last time refreshed and a last time accessed. A user request for refreshing an internet web page is received and the internet web page is refreshed. Utilizing the refreshed internet web page, checking for changes in the refreshed internet web page is performed. Then scanning the stored page data is performed and for each user selected internet web page, the stored refresh interval is compared with a current refresh time interval. For each user selected internet web page, responsive to the current refresh time interval being greater than the stored refresh time interval, the internet web page is refreshed. A feedback message is sent to the user responsive to refreshing an internet web page and the stored refresh interval is updated.

18 Claims, 12 Drawing Sheets

DATA STRUCTURES

PAGE DATA 200

| |
|---|
| URL 202 |
| REFRESH INTERVAL 204 |
| WEEKEND INTERVAL 206 |
| LAST TIME REFRESHED 208 |
| TIME OF DAY ARRAY 210 |
| CRC OR HASH VALUE 212 |
| AUTO REFRESH ON/OFF 214 ← OPTIONAL |
| LAST TIME ACCESSED 216 |

FIG. 1

DATA STRUCTURES

PAGE DATA 200

| |
|---|
| URL 202 |
| REFRESH INTERVAL 204 |
| WEEKEND INTERVAL 206 |
| LAST TIME REFRESHED 208 |
| TIME OF DAY ARRAY 210 |
| CRC OR HASH VALUE 212 |
| AUTO REFRESH ON/OFF 214 ← OPTIONAL |
| LAST TIME ACCESSED 216 |

INTELLIGENT METHOD, APPARATUS AND COMPUTER PROGRAM PRODUCT FOR AUTOMATED REFRESHING OF INTERNET WEB PAGES

This application is a divisional application of Ser. No. 08/954,026 filed Oct. 20, 1997, now U.S. Pat. No. 5,907,681.

FIELD OF THE INVENTION

The present invention relates generally to the data processing field, and more particularly, relates to a method, apparatus and computer program product for automated, intelligent refreshing of internet web pages.

DESCRIPTION OF THE RELATED ART

Valuable information available on the internet or World Wide Web (WWW) is often difficult or cumbersome and time consuming to use for reviewing internet web pages using current browsing technology. Refreshing of WWW sites is not handled well by browsers today. Known techniques typically cause either too much web traffic by refreshing too frequently, or not enough when refreshing is not provided when needed.

Most users keep a list, called either bookmarks or favorites, of the pages they often view. Known commercially available web browser programs include, for example, Netscape Navigator Version 3.01 and Microsoft Internet Explorer 3.0. These browser programs allow the user to specify, on a global browser basis, how often web pages should be refreshed. The choices include always or every time the page is accessed, once per session, or never.

This manual approach, although better than nothing, often is under used, and in many cases not used at all, for control of refreshing. There are too many sites in typical bookmark lists for the average user to manually enter a wise refresh rate for each site. Individual users often lack information needed to effectively select a refresh option to effectively define how often individual pages are updated. Many users pick a higher than needed refresh rate just to be on the safe side, with a resulting needless increase in network traffic.

Another problem with browsers is that feedback of the effectiveness of user selected refresh options is nonexistent. Some internet web pages usually change on an hourly, daily, weekly, or monthly basis. Once a user picks a refresh option, the user has no way of knowing if the selection was a good choice. Of the refreshes that are performed responsive to a particular user selected refresh option, no feedback is provided on how many were needed or how many should have been done.

A need exists for browser technology that enables automated, flexible and efficient refreshing of internet web pages.

SUMMARY OF THE INVENTION

A principal object of the present invention is to provide an intelligent method, apparatus and computer program product for automated refreshing of internet web pages. Other important objects of the present invention are to provide such refreshing method, apparatus and computer program product that efficiently and effectively facilitates refreshing of particular internet web pages to be reviewed; to provide such refreshing method, apparatus and computer program product substantially without negative effect; and provide such refreshing method, apparatus and computer program product that overcome many of the disadvantages of prior art arrangements.

In brief, an intelligent method, apparatus and computer program product are provided for automated refreshing of internet web pages. Page data are stored including a record of page data values for each user selected internet web page. The page data values include at least one refresh interval, a last time refreshed and a last time accessed. A user request for refreshing an internet web page is received and the internet web page is refreshed. Utilizing the refreshed internet web page, checking for changes in the refreshed internet web page is performed. Then scanning the stored page data is performed and for each user selected internet web page, the stored refresh interval is compared with a current refresh time interval. For each user selected internet web page, responsive to the current refresh time interval being greater than the stored refresh time interval, the internet web page is refreshed.

In accordance with features of the invention, a feedback message is sent to the user responsive to refreshing an internet web page and the stored refresh interval is updated.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
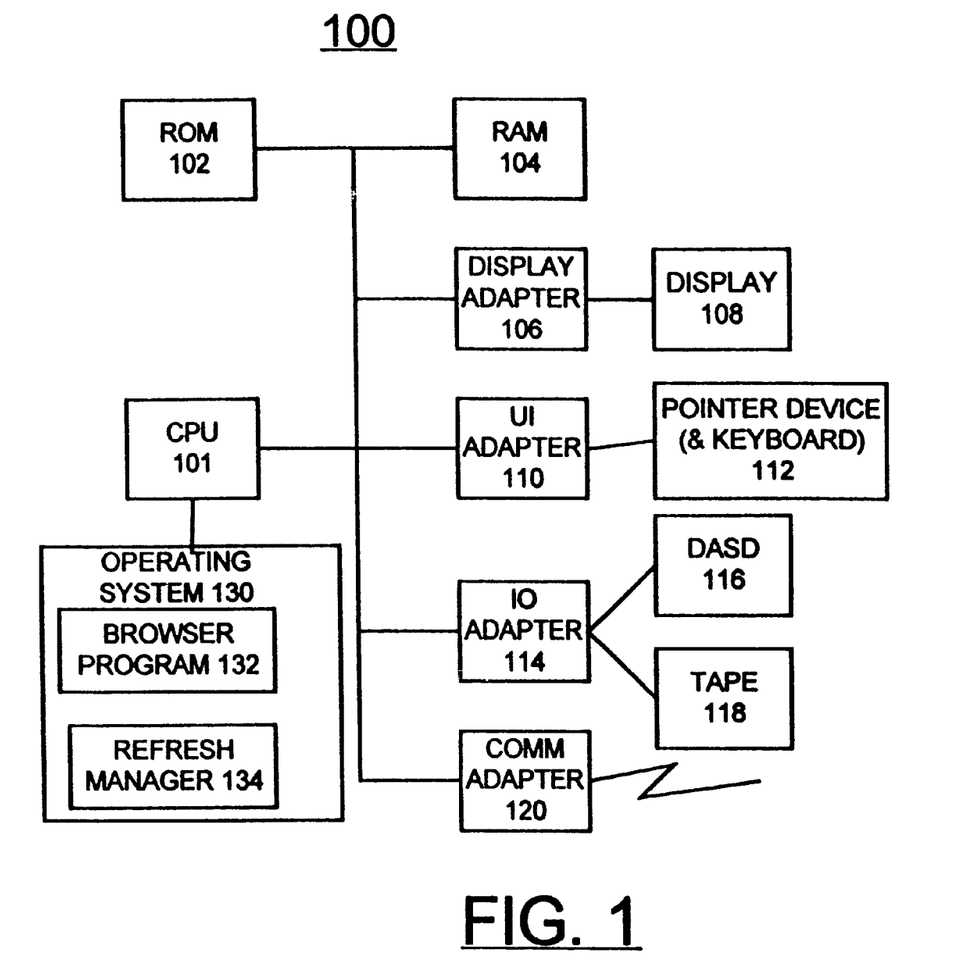
FIG. 1 is a block diagram representation illustrating a computer system for implementing a method for intelligent, automated refreshing of internet web pages in accordance with the invention.

Having reference now to the drawings, in FIG. 1, there is shown a computer or data processing system of the preferred embodiment generally designated by the reference character 100. As shown in FIG. 1, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (10) adapter 114 connected to a direct access storage device (DASD) 116 and a tape unit 118. CPU 101 is connected to a communications adapter 120 providing a communications function. The computer system 100 includes an operating system 130, an internet browser program 132 and a refresh manager 134 of the preferred embodiment.

Various commercially available processors could be used for computer system 100, for example, an IBM personal computer or similar workstation can be used. Central processor unit 101 is suitably programmed to execute the flowchart of FIGS. 4A, 4B, 5, 6, 7A, 7B, 7C, 7D, and 7E of the preferred embodiment.

In accordance with features of the preferred embodiment, internet browser program 132 and refresh manager 134 enables intelligent, automated refreshing for individual user selected internet web pages. Browser 132 provides automatic refresh functions utilizing heuristic data and other techniques and browser 132 provide feedback to the user. This is accomplished with refresh manager 134 maintaining and updating refreshing information together with the bookmarks and favorites data. The computed and personalized refresh rates advantageously are integrated into a bookmark list or the like so that an HTML tag solution is not required, and so that refresh rates can be personalized and overridden. The initial refresh rate may be set in three different ways: 1) by today's browsers with very limited optionsi 2) by a manual setting; or 3) by loading from an HTML tag within the web site of interest. Disadvantages with the use of an HTML tag result because it is dependent on the site owner keeping it up to date, and the initial setting may be wrong or outdated. If HTML tags eventually are used to provide a refresh rate, this tag is recognized and used to determine a starting point, then this starting point refresh rate is improved by the intelligent method of automated refreshing of the present invention.

The intelligent method of automated refreshing of the present invention provides the feedback to the user. For example, a user may be interested in a web site that tracks prices of a distributor of products used in the user's business. Suppose that the refresh rate is initially set for 1 hour, using either of the three above options. The user needs to know if this was a good value or is consuming too much traffic, or not refreshing often enough. The user needs to know how to adjust or fine tune the refreshing rate with minimal effort. In accordance with features of the preferred embodiment, internet browser program 132 and refresh manager 134 provide at each refresh, a checksum or other technique that is used to determine if the site page has changed since the last refresh. This information is presented to the user. Appropriate graphs or warning signals are given, such as "you are refreshing too often", or "this site has high activity and you may want to refresh more often."

The intelligent method of automated refreshing of the present invention heuristically adjusts the refreshing rate using the initial rate as a start, based on history, including provisions for special cases, such as weekends and holidays. The user can subsequently manually override this automatically generated schedule. However, without the automatic refreshing rate adjustment of the preferred embodiment, the user may never figure out the best refresh rates, or more likely never have the time or inclination to try. Use of the intelligent method of automated refreshing of the present invention can be extremely valuable for reducing network traffic.

For example, the intelligent method of automated refreshing of the present invention may determine that a site changes every hour from 8 a.m. to 5 p.m. on weekdays. Or, alternatively, it may compute that a site changes every week day at noon, and key in on the provider's schedule for updating the site. Other sites might be updated on weekends, or have high activity during certain seasons of the year, which could then be automatically reflected in their refresh rates. On the other hand, if after time the site is determined to be erratic in its updates, so that a refresh schedule is hard to automate, a formula can at least determine times to block out refreshing, such as midnight to 5 a.m. local time of the provider of the site. Even this minimal amount of optimization could save large amounts of network traffic, which today's schemes for refreshing do not take into account. If a site is found to be inactive over some period of time, in addition to appropriately adjusting the refresh schedule, a warning message can be generated to indicate that the site has not changed in an identified number of weeks, months or years.

Figure 2:
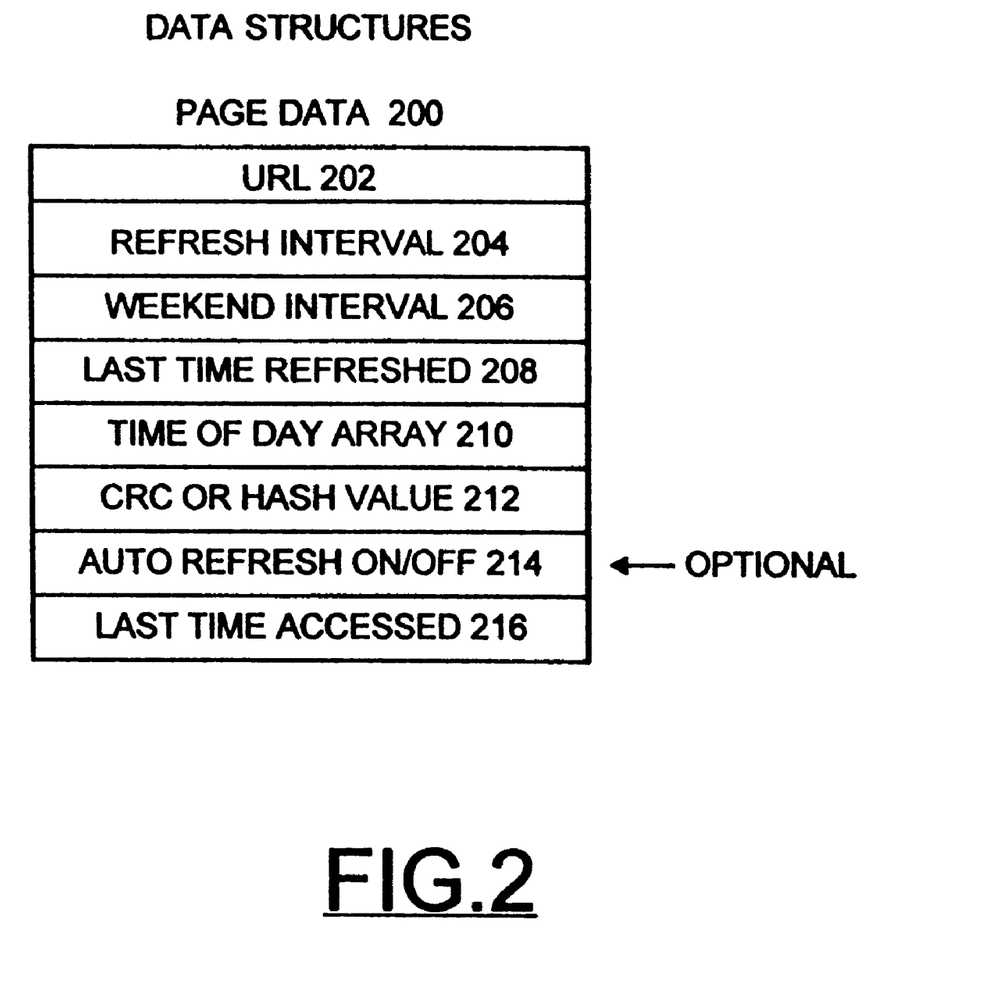
FIGS. 2 and 3 are charts illustrating data structures respectively including exemplary page data and an exemplary auto refresh switch for implementing a method for intelligent, automated refreshing of internet web pages in accordance with the invention.

Referring now to FIG. 2, an exemplary page structure 200 is illustrated for implementing the method for intelligent, automated refreshing of internet web pages in accordance with the invention. Page data structure 200 is persistent from one run of the browser program 132 to another. Page data structure 200 includes a universal resource locator (URL) 202, a refresh interval 204, a weekend interval 206, a last time refreshed 208, a time of day array 210, a cyclic redundancy check (CRC) or hash value 212, an auto refresh ON/OFF 214, and a last time accessed 216.

Page data structure 200 is stored as a list or array of the records 202, 204, 206, 208, 210, 212, 214, 216 for each user selected internet web page in a bookmark list or favorites data for a particular user. The refresh interval 204 defines a time interval to refresh a page in cache when this much time has passed. The weekend interval 206 defines a refresh time interval to refresh a page in cache that is used only on weekends. A time of day array is a collection of refresh intervals, such as one for each hour which is used to a page during a particular hour of the day. The CRC or hash value 212 is an integer value used to determine if a page has changed, for example, determined by adding together all the bytes in a page.

Figure 3:
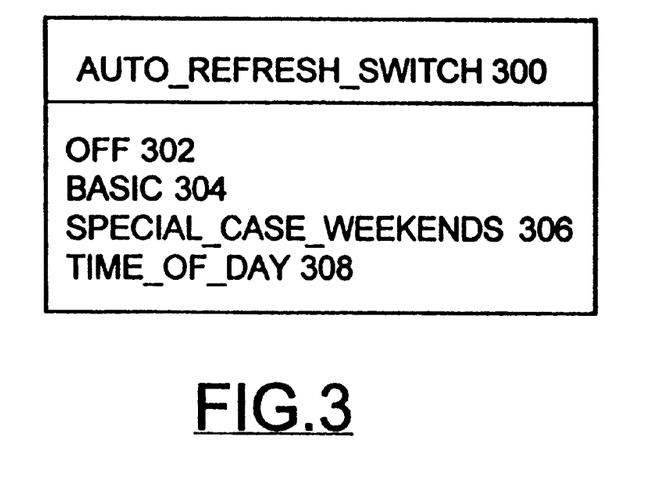

FIG. 3 illustrates an exemplary auto refresh switch data structure 300 for implementing the method for intelligent, automated refreshing of internet web pages in accordance with the invention. Auto refresh switch 300 includes multiple fields for defining a plurality of refreshing operational modes including off 302, basic 304, special_case_weekends 306 and time_of_day 308.

Figure 4A:
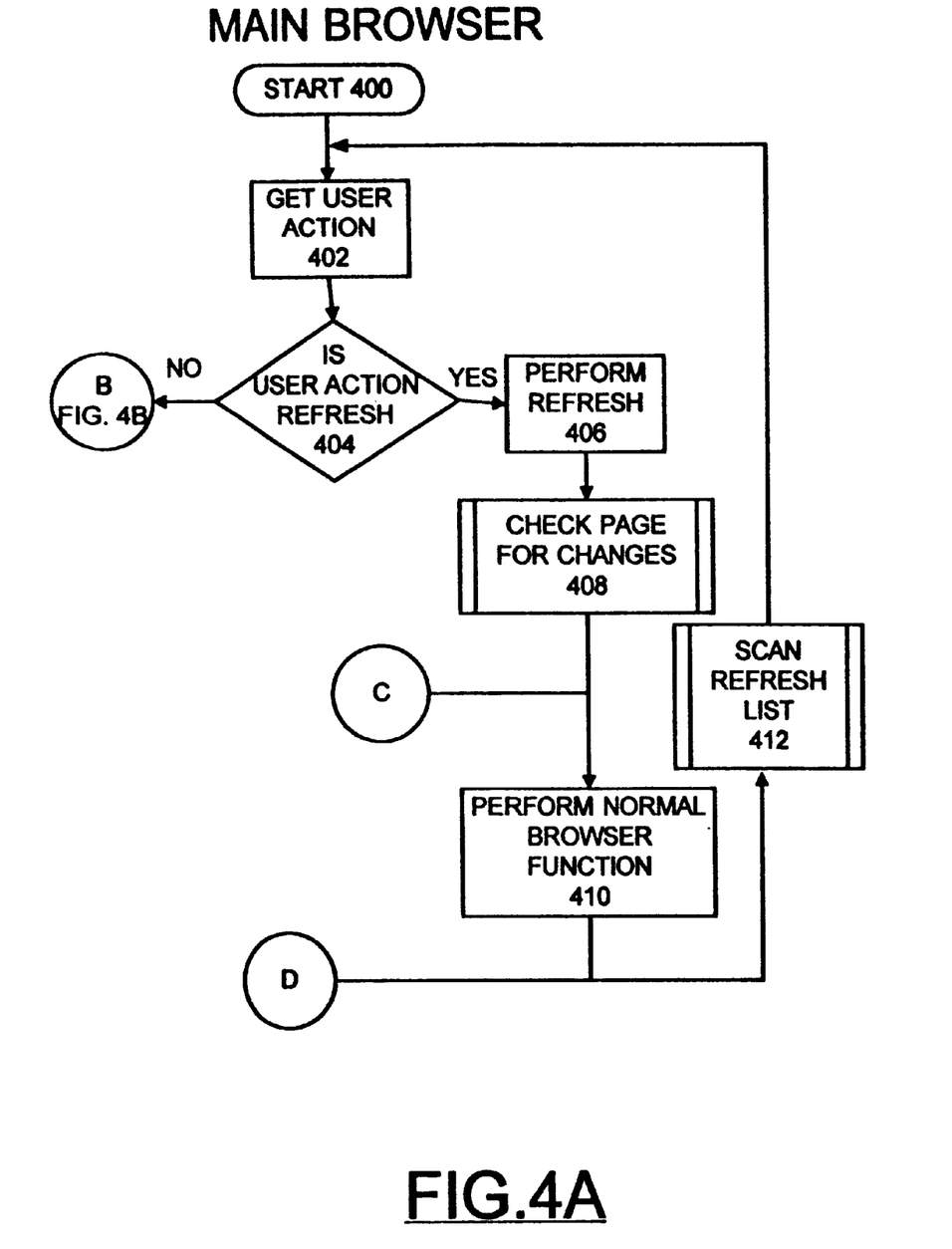
FIGS. 4A and 4B together provide a flow chart illustrating sequential browser steps for the automated method for refreshing of internet web pages of the preferred embodiment.
Figure 4B:
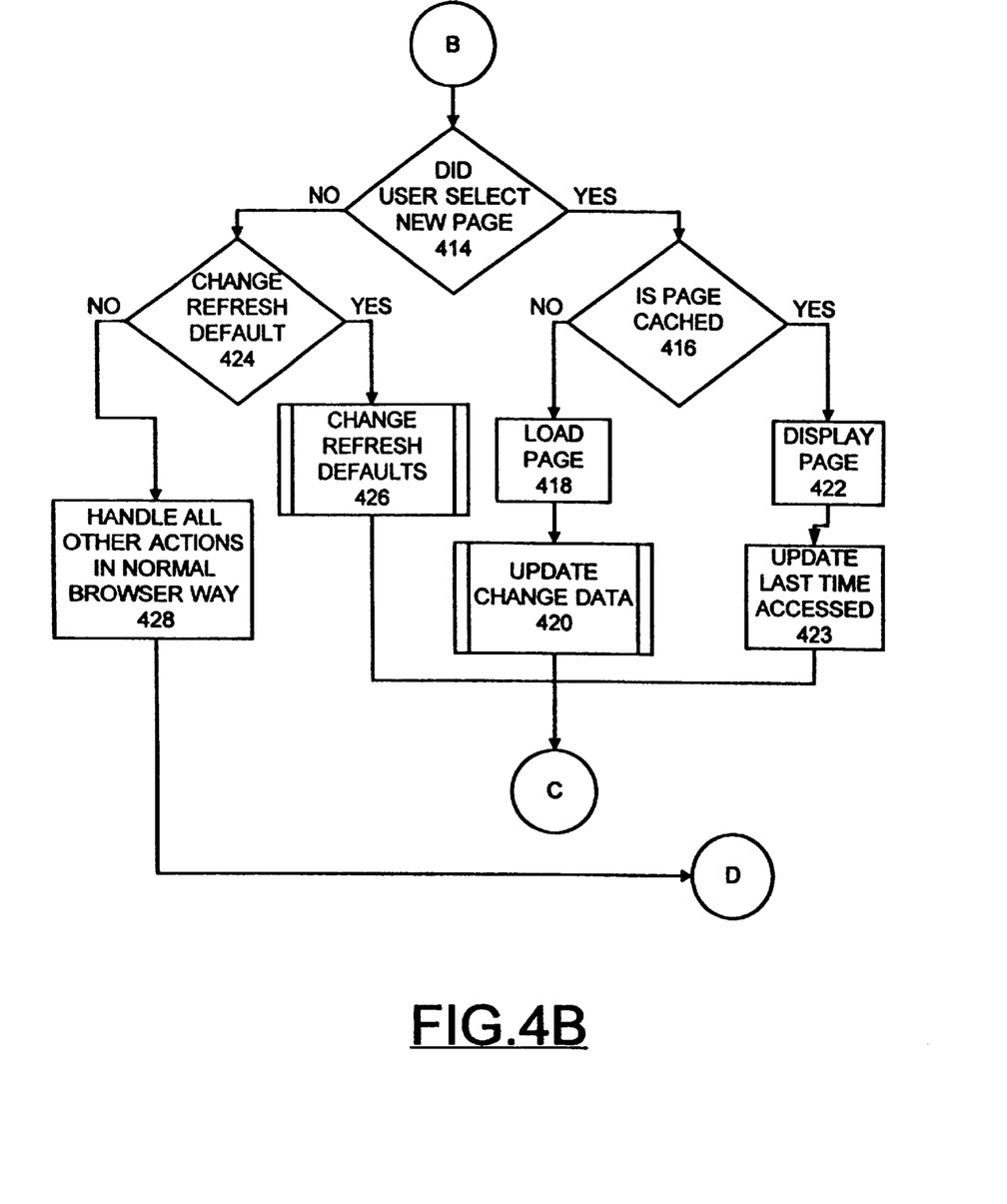

Referring to FIGS. 4A and 4B, there are shown exemplary sequential steps of browser 132 for implementing the method for intelligent, automated refreshing of internet web pages starting at a block 400. A user action is received as indicated at a block 402. It is determined whether the user action to refresh a web page as indicated at a decision block 404. If not, then the sequential operations continue following entry point B in FIG. 4B. When a user action to refresh a web page is identified at block 404, then refreshing is performed as indicated at a block 406. Then a routine illustrated and described with respect to FIG. 5, to check the page for changes is performed as indicated at a block 408. Then the normal browser function is performed as indicated at a block 410. Then a routine illustrated and described with respect to FIGS. 7A, 7B, 7C, 7D and 7E, to scan an automatic refresh list or page data is performed as indicated at a block 412. Then the sequential operations return to block 402 to get a user action.

Figure 6:
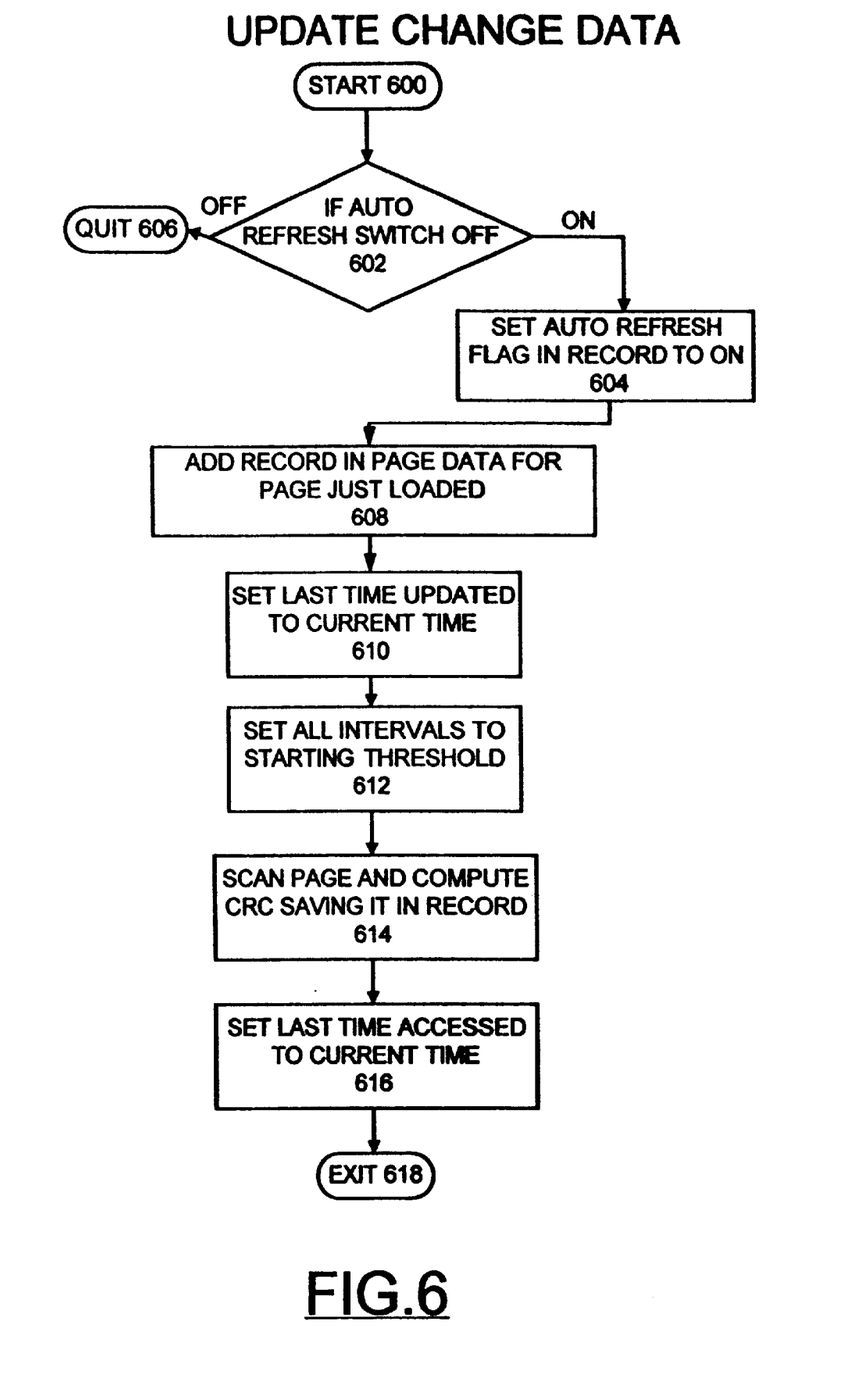
FIG. 6 is a flow chart illustrating sequential browser steps for updating change data in the automated method for refreshing of internet web pages of the preferred embodiment.

Referring to FIG. 4B, when a user action to refresh a web page is not identified at block 404, then checking whether the user selected a new page is provided as indicated at a decision block 414. If the user selected a new page, then checking whether the page is stored in cache is provided as indicated at a decision block 416. If the page is not cached, then the page is loaded as indicated at a block 418. Next a routine illustrated and described with respect to FIG. 6, is performed to update change data as indicated at a block 420. If determined that the page is cached at block 416, then the page is displayed as indicated at a block 422. Then the sequential operations return to block 410 in FIG. 4A following entry point C to perform the normal browser function.

In FIG. 4B, when the user did not select a new page at block 414, then checking to change refresh defaults is performed as indicated at a decision block 424. If yes, a routine to change refresh defaults is performed as indicated at a block 426. The refresh default values updated at block 426 can include a starting threshold or initial refresh interval, a reduction amount or amount to reduce refresh intervals by when a page changes so that refreshing occurs more often, an increase amount or amount to increase refresh intervals by when a page does not change so that refreshing occurs less frequently, and a cleanup threshold or time interval that a page has not been accessed to remove page from cache. Otherwise when change refresh default is not indicated at block 424, then all other actions are handled in the normal function of browser 132. Then the sequential operations return to block 412 in FIG. 4A following entry point D to scan the refresh list.

Figure 5:
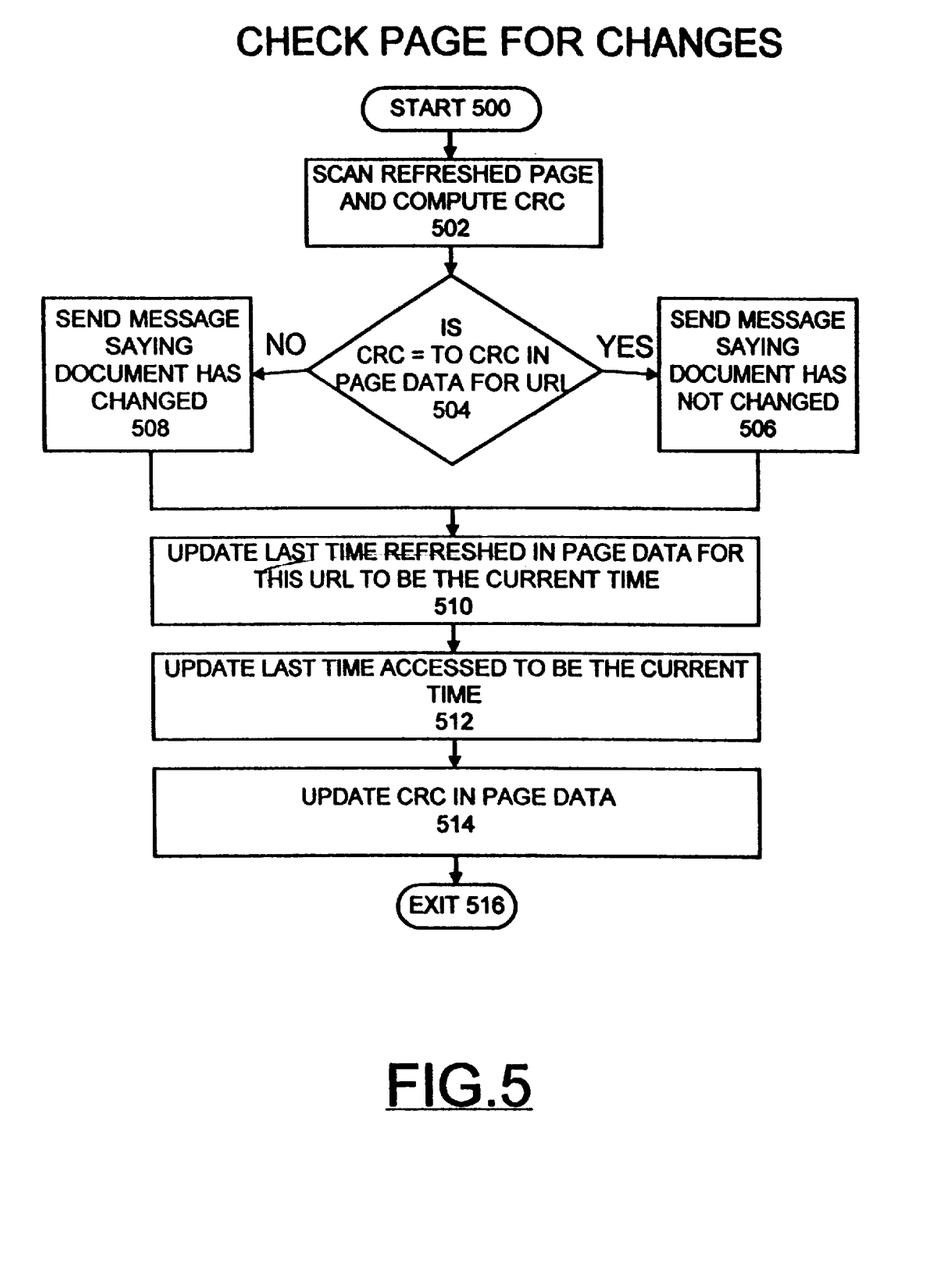
FIG. 5 is a flow chart illustrating sequential browser steps for checking for internet web page changes in the automated method for refreshing of internet web pages of the preferred embodiment.

Referring to FIG. 5, there are shown exemplary sequential steps of browser 132 for checking for internet web page changes in the automated method for intelligent, automated refreshing of internet web pages starting at a block 500. As indicated at a block 502, the refreshed page from block 406 in FIG. 4A is scanned and the CRC is computed. Then the calculated CRC is compared to the CRC 212 in the date data 200 for this URL 202 as indicated at a decision block 504. If the calculated and stored CRCs are equal, then a message is sent saying that the document has not changed as indicated at a block 506. Otherwise if the calculated and stored CRCs are not equal, then a message is sent saying that the document has changed as indicated at a block 508. Then the last time refreshed value 208 for this URL 202 in the page data 200 is updated to be the current time as indicated at a block 510. Next the last time accessed value 216 for this URL 202 in the page data 200 is updated to be the current time as indicated at a block 512. Then the CRC value 212 for this URL 202 in the page data 200 is updated to be the calculated CRC as indicated at a block 514. Then the routine is exited as indicated at a block 516 and the sequential operations return.

Referring to FIG. 6, there are shown exemplary sequential steps of browser 132 for updating change data in the automated method for intelligent, automated refreshing of internet web pages starting at a block 600. Checking whether the auto refresh switch off is performed as indicated at a decision block 602. If the auto refresh switch is on, then an auto refresh flag is set in a page data record to on as indicated at a block 604. Otherwise, if the auto refresh switch is off, then the operations stop as indicated at a block 606. After the auto refresh flag is set to on at block 604, the record is added in page data 200 for a particular page just loaded as indicated at a block 608. The last time updated or refreshed 208 is set to the current time as indicated at a block 610. All intervals 204, 206, 210 are set to the starting threshold value to define an initial refresh interval as indicated at a block 612; as discussed above, the initial refresh interval value can be obtained from an HTML tag for the page. The page just loaded is scanned and a CRC is computed and saved in the record as indicated at a block 614. Next the last time accessed value 216 for this URL 202 in the page data 200 is set to be the current time as indicated at a block 616. Then the routine is exited as indicated at a block 618 and the sequential operations return.

Figure 7A:
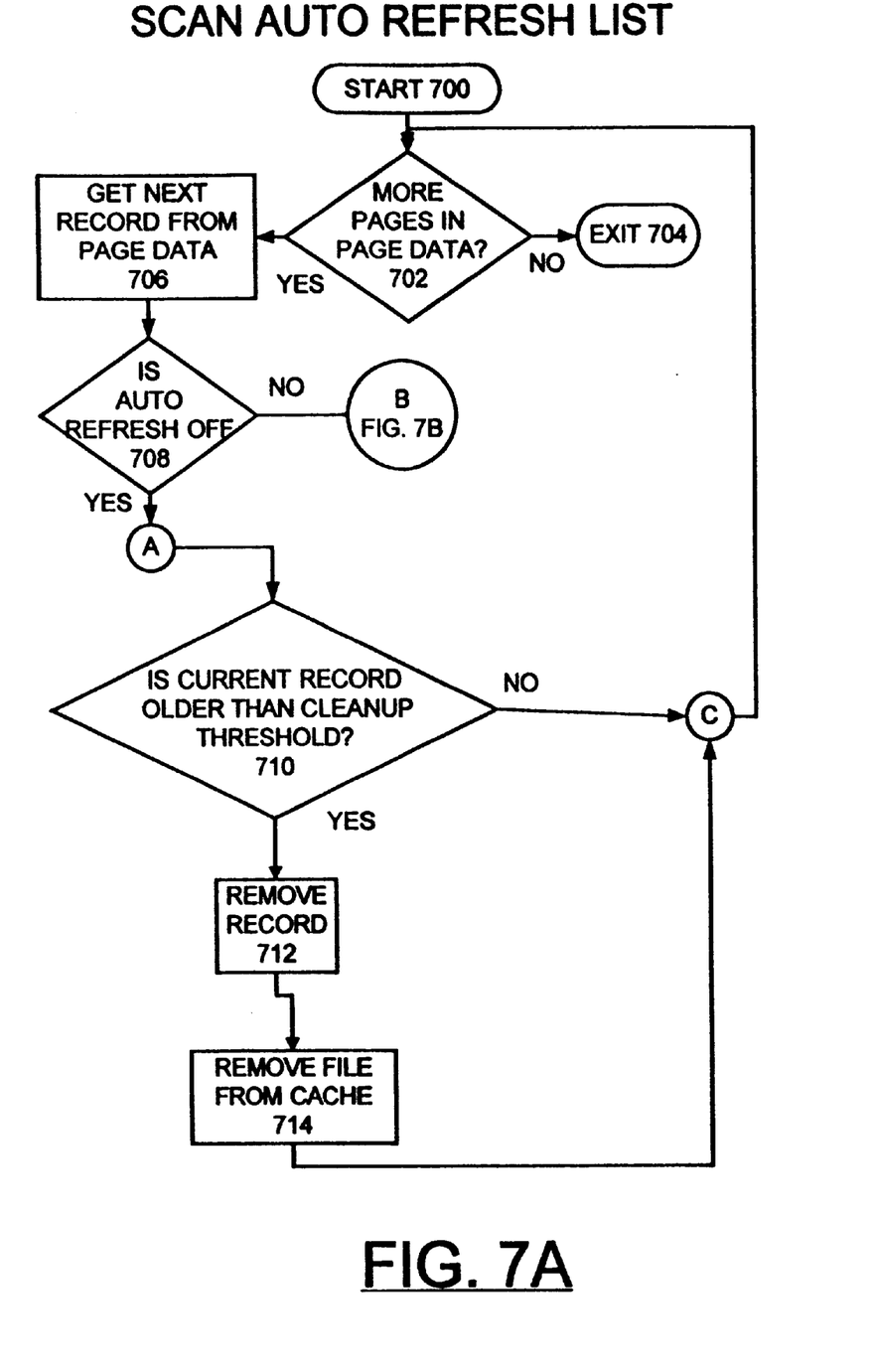
FIGS. 7A, 7B, 7C, 7D and 7E together provide a flow chart illustrating sequential browser steps to scan an auto refresh list in the automated method for refreshing of internet web pages of the preferred embodiment.

Referring to FIGS. 7A, 7B, 7C, 7D and 7E, there are shown exemplary sequential steps of browser 132 to scan the auto refresh list in the automated method for intelligent, automated refreshing of internet web pages starting at a block 700 in FIG. 7A. Checking for more pages to scan in the page data is performed as indicated at a decision block 702. When there are no more pages to scan, the routine is exited as indicated at a block 704. When there are more pages to scan, then a next recorded is obtained from the page data 200 as indicated at a block 706. Checking whether the auto refresh switch is off is performed as indicated at a decision block 708. If the auto refresh switch is not off, then the sequential operations continue following entry point B in FIG. 7B. When the auto refresh switch is off, then following entry point A checking whether the current record is older that the cleanup threshold is performed as indicated at a decision block 710. If the current record is not older that the cleanup threshold, then the sequential operations return following entry point C to block 702 to check for more pages.

Figure 7B:
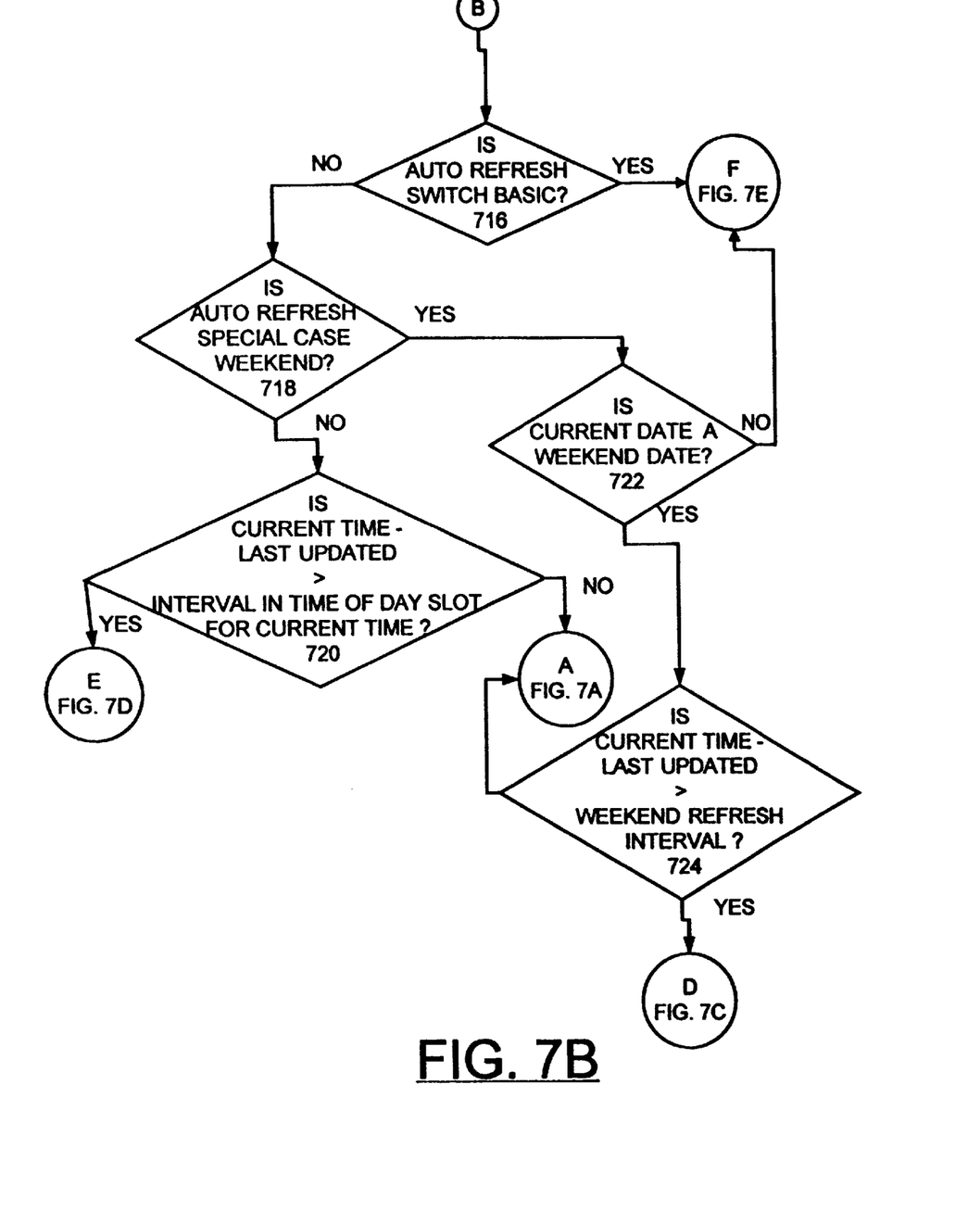

Referring to FIG. 7B, when determined that the auto refresh switch is not off at block 708 in FIG. 7A, then checking whether the auto refresh switch is set to basic as indicated at a block 716. If so, then the sequential operations continue following entry point F in FIG. 7E. Otherwise if the auto refresh switch is not set to basic, then checking whether the auto refresh switch is set to special case weekend is performed as indicated at a decision block 718. If the auto refresh switch is not set to special case weekend, then the current time less the last updated time is compared with the interval in the time of day slot for the current time as indicated at a decision block 720. If the resulting value for the current time less the last updated time is not greater the interval in the time of day slot for the current time, then the sequential operations return following entry point A for checking whether the current record is older that the cleanup threshold at decision block 710. Otherwise when the resulting value for the current time less the last updated time is greater the interval in the time of day slot for the current time, then the sequential operations continue following entry point E in FIG. 7D. When the auto refresh switch is set to special case weekend at block 718, then checking whether the current date is a weekend date is performed as indicated at a decision block 722. If the current date is not a weekend date, then the sequential operations continue following entry point F in FIG. 7E. When the current date is a weekend date, then the current time less the last updated value is compared with the stored weekend refresh interval as indicated at a decision block 724. If the current time less the last updated value is not greater than the stored weekend refresh interval, then the sequential operations return following entry point A for checking whether the current record is older that the cleanup threshold at decision block 710. If the current time less the last updated value is greater than the stored weekend refresh interval, then the sequential operations continue following entry point D in FIG. 7C.

Figure 7C:
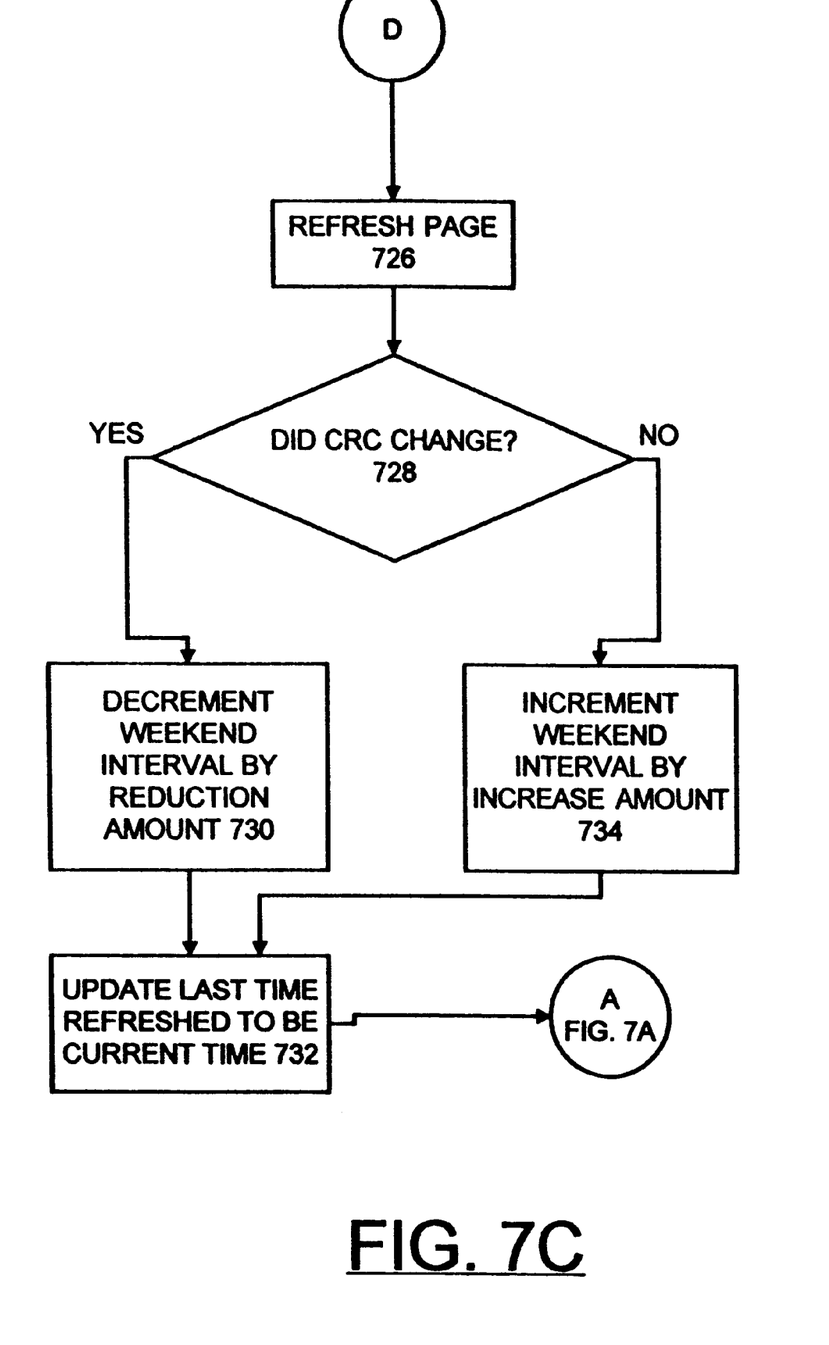
Figure 7D:
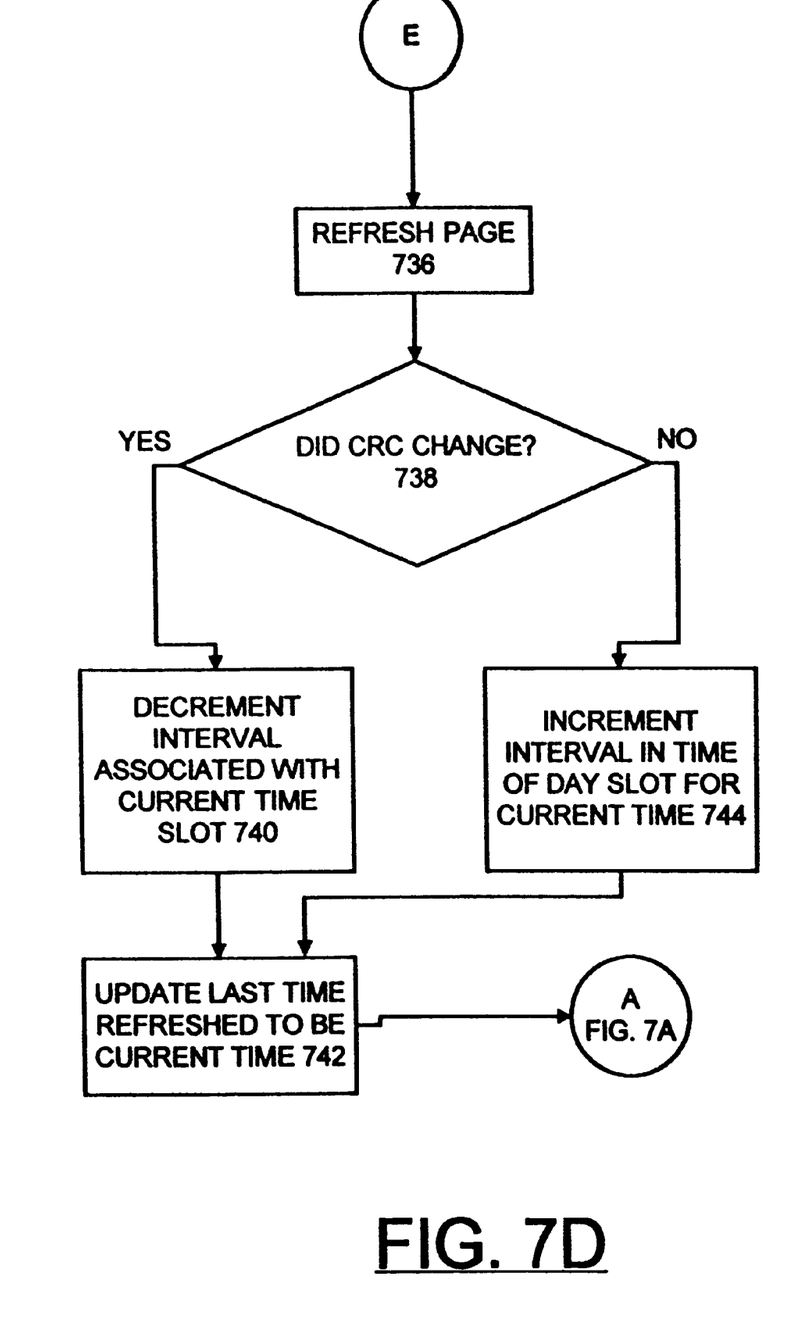

Referring to FIG. 7C, then this page in the page data 200 is refreshed as indicated at a block 726. Checking whether the CRC value 212 changed is performed as indicated at a decision block 728. If the CRC value 212 changed, then the weekend interval is decremented by a stored reduction amount as indicated at a block 730 s0 that refreshing occurs more often. Then the last time refreshed is updated to be the current time as indicated at a block 732 and the sequential operations return following entry point A in FIG. 7A. If the CRC value 212 did not change, then the weekend interval is incremented by a stored increase amount as indicated at a block 734. Then the last time refreshed is updated to be the current time at block 732 and the sequential operations return following entry point A in FIG. 7A for checking whether the current record is older that the cleanup threshold at decision block 710.

Referring to FIG. 7C, then this page in the page data 200 is refreshed as indicated at a block 736. Checking whether the CRC value 212 changed is performed as indicated at a decision block 738. If the CRC value 212 changed, then the interval associated with the time of day slot is decremented by a stored reduction amount as indicated at a block 740. Then the last time refreshed is updated to be the current time as indicated at a block 742 and the sequential operations return following entry point A in FIG. 7A. If the CRC value 212 did not change, then the interval associated with the time of day slot is incremented by a stored increase amount as indicated at a block 744. Then the last time refreshed is updated to be the current time at block 742 and the sequential operations return following entry point A in FIG. 7A for checking whether the current record is older that the cleanup threshold at decision block 710.

Figure 7E:
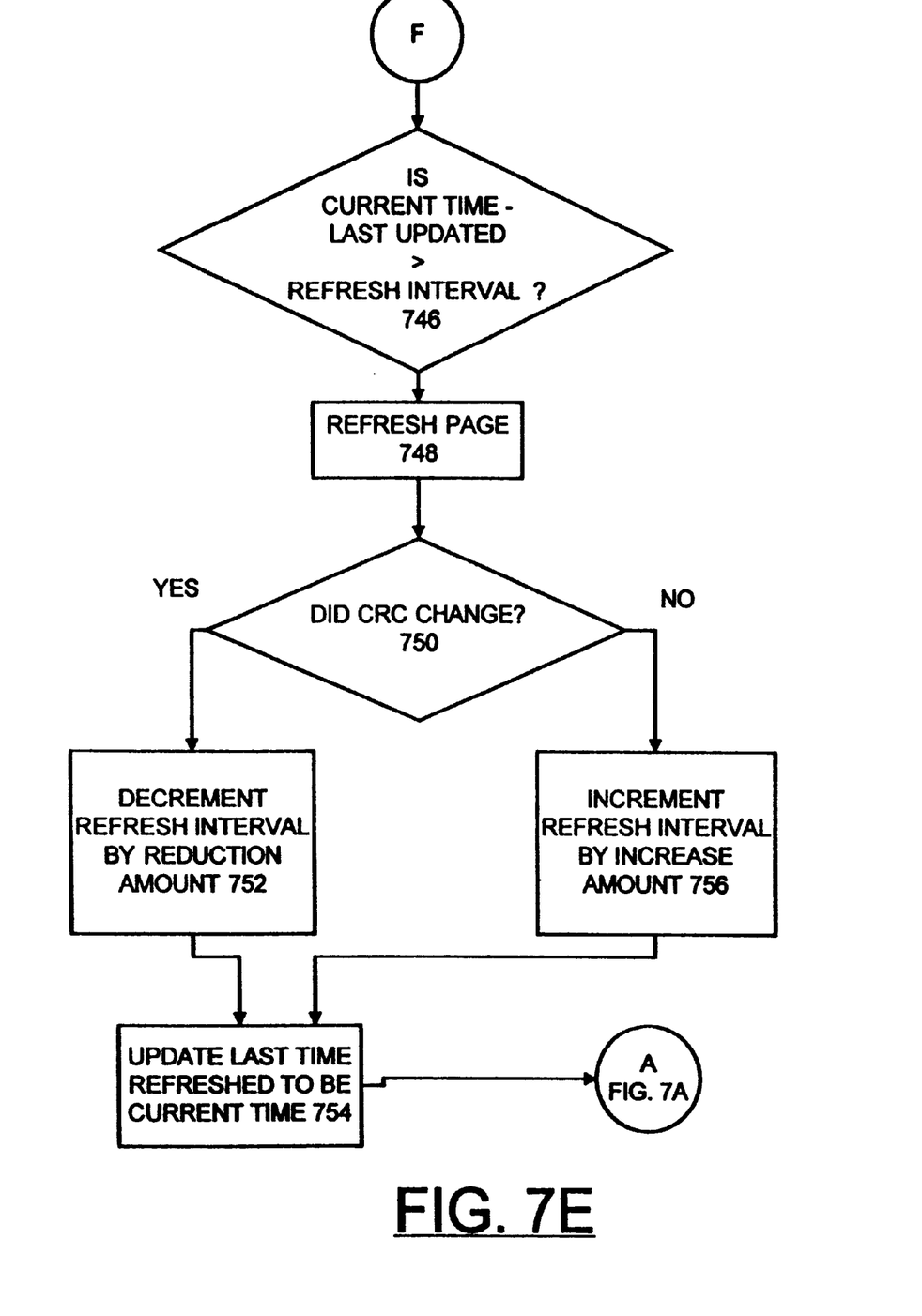

Referring to FIG. 7E, the auto refresh switch is set to basic at block 716 in FIG. 7B, then the sequential operations continue following entry point F with checking whether the current time less the last time updated is greater than the refresh interval as indicated at a decision block 742. Then this page in the page data 200 is refreshed as indicated at a block 744. Checking whether the CRC value 212 changed is performed as indicated at a decision block 746. If the CRC value 212 changed, then the refresh interval is decremented by a stored reduction amount as indicated at a block 748. Then the last time refreshed is updated to be the current time as indicated at a block 750 and the sequential operations return following entry point A in FIG. 7A. If the CRC value 212 did not change, then the refresh interval is incremented by a stored increase amount as indicated at a block 752. Then the last time refreshed is updated to be the current time at block 750 and the sequential operations return following entry point A in FIG. 7A for checking whether the current record is older that the cleanup threshold at decision block 710.

Figure 8:
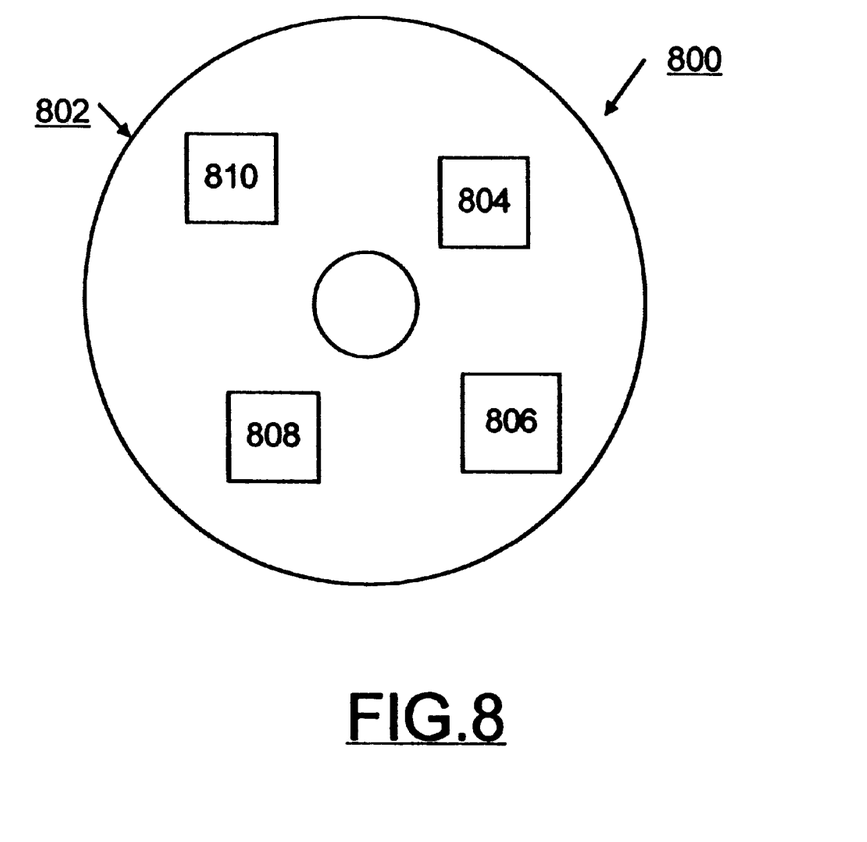
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for intelligent, automated refreshing of internet web pages of the preferred embodiment in the system 100 of FIG. 1.

A sequence of program instructions or a logical assembly of one or more interrelated modules defined by the recorded program means 804, 806, 808, 810, direct the computer system 100 for implementing intelligent, automated refreshing of internet web pages of the preferred embodiment.

In the preferred embodiment of a dynamic refresh mechanism, the refresh rate is constantly adjusted by incrementing and decrementing. If it is incremented and decremented by equal amounts, the refresh rate will approach a value near which the web page will have been changed approximately 50% of the time. However, any of various alternative formulations could be used to adjust the refresh rate. For example, different values could be used for incrementing and decrementing, causing the refresh rate to converge on a higher or lower value. Furthermore, the system could adjust the refresh rate based on an average over multiple refresh invervals, rather than adjust with each refresh interval. Additionally, any of various methods can be used to cause rapid convergence of the refresh rate on an optimal value, followed by stable behavior once the refresh rate is near the optimal value. For example, the adjustment amount could include an aging coefficient, whereby the amount of the adjustment is initially high, and decreases over time as it is assumed that the refresh rate will converge on an optimal value. Alternatively, the adjustment amount could be decreased each time an adjustment (higher or lower refresh rate) is in a different direction from the previous adjustment. Finally, it may be desirable to impose minimum and maximum limits on the refresh rate, so that the rate does not reach unreasonable levels. For example, some web pages may be updated with extreme frequency, and it may be undesirable to attempt to keep up with all the updates.

In the preferred embodiment, a computer system automatically adjusts the refresh rate in response to a determination that the rate should be adjusted, although it is possible to manually override any adjusted rate. In an alternative embodiment, it would be possible for the system to compute the adjustment and provide an appropriate message to the user, requiring user confirmation before storing the adjusted value for the refresh rate.

While the present invention has been described with reference to the details of the embodiments of the invention shown in the drawing, these details are not intended to limit the scope of the invention as claimed in the appended claims.

What is claimed is:

1. An intelligent method for automated refreshing of internet web pages comprising the steps of:

storing page data including a record of page data values for each user selected internet web page; said page data values including at least one refresh time interval, a last time refreshed and a last time accessed;

receiving a user request for refreshing an internet web page;

refreshing of said internet web page;

utilizing said refreshed internet web page, checking for changes in said refreshed internet web page;

scanning said stored page data and for each said user selected internet web page, comparing said at least one refresh time interval with a current refresh time interval; and for each said user selected internet web page, responsive to said current refresh time interval being different from said stored at least one refresh time interval, updating said stored at least one refresh time interval.

2. An intelligent method for automated refreshing of internet web pages as recited in claim 1 wherein said step of storing page data including a record of page data values for each user selected internet web page includes the step of identifying an added user selected internet web page to a favorite or bookmark list of internet web pages and storing said record of page data values for said user added internet web page to said favorite or bookmark list, said page data values further including a cyclic redundancy check (CRC) value.

3. An intelligent method for automated refreshing of internet web pages as recited in claim 2 wherein said step of checking for changes in said refreshed internet web page includes the steps of calculating said CRC value for said refreshed internet web page and comparing said calculated CRC value with a store CRC value for said refreshed internet web page.

4. An intelligent method for automated refreshing of internet web pages as recited in claim 1 further includes the step of responsive to an identified change in said refreshed internet web page, sending a message for user viewing indicating that the internet web page has changed.

5. An intelligent method for automated refreshing of internet web pages as recited in claim 1 further includes the step of responsive to an identified no change in said refreshed internet web page, sending a message for user viewing indicating that the internet web page has not changed.

6. An intelligent method for automated refreshing of internet web pages as recited in claim 1 wherein said step of scanning said stored page data and for each said user selected internet web page, comparing said stored at least one refresh interval with a current refresh time interval includes the steps of subtracting a last time updated from a current time to identify said current refresh time interval; and responsive to refreshing said internet web page, checking for changes in said refreshed internet web page, and responsive to said checking step, selectively displaying a message for viewing by the user.

7. An intelligent method for automated refreshing of internet web pages as recited in claim 6 further includes the step of responsive to said checking step, updating said stored at least one refresh time interval.

8. An intelligent method for automated refreshing of internet web pages as recited in claim 1 further includes the steps of responsive to each said refreshing step, updating said stored at least one refresh time interval.

9. An intelligent method for automated refreshing of internet web pages as recited in claim 1 further includes the step of receiving a user selected new page; checking for said user selected new page in local memory; responsive to identifying said selected new page in local memory, displaying said selected new page and updating said last time accessed page data value.

10. An intelligent method for automated refreshing of internet web pages as recited in claim 9 further includes the step responsive to said selected new page not being stored in local memory, loading said selected new page, displaying said loaded new page and updating said stored page data for said loaded new page.

11. An intelligent method for automated refreshing of internet web pages as recited in claim 1 further includes the step checking for a change in refresh default values and updating said stored page data responsive to an identified changed refresh default value.

12. A computer program product for use in a computer system comprising:
   a recording medium;
   means, recorded on the recording medium, for storing page data including a-record of page data values for each user selected internet web page; said page data values including at least one refresh time interval, a last time refreshed and a last time accessed;
   means, recorded on the recording medium, for receiving a user request for refreshing an internet web page;
   means, recorded on the recording medium, for refreshing of said internet web page;
   means, recorded on the recording medium, utilizing said refreshed internet web page, for checking for changes in said refreshed internet web page;
   means, recorded on the recording medium, for scanning said stored page data and for each said user selected internet web page, for comparing said at least one refresh time interval with a current refresh time interval; and
   means, recorded on the recording medium, for each said user selected internet web page, responsive to said current refresh time interval being different from said stored at least one refresh time interval, for updating said stored at least one refresh time interval.

13. A computer program product as recited in claim 12 include a refresh manager program and a browser program; and wherein said means, recorded on the recording medium, for storing page data including a record of page data values for each user selected internet web page include means, recorded on the recording medium, for identifying an added user selected internet web page to a favorite or bookmark list of internet web pages and for storing said record of page data values for said user added internet web page to said favorite or bookmark list, and wherein said page data values further includes a cyclic redundancy check (CRC) value.

14. A computer program product as recited in claim 12 further include means, recorded on the recording medium, for responsive to said refreshed internet web page, sending a message to a user.

15. A computer system having apparatus for automated refreshing of internet web pages comprising:
   a processor,
   a memory;
   a communications adapter;
   a bus connecting said processor, memory, and communications adapter;
   means for storing page data including a record of page data values for each user selected internet web page; said page data values including at least one refresh time interval, a last time refreshed and a last time accessed;
   means for receiving a user request for refreshing an internet web page;
   means for refreshing of said internet web page;
   means, utilizing said refreshed internet web page, for checking for changes in said refreshed internet web page;
   means for scanning said stored page data and for each said user selected internet web page, for comparing said at least one refresh time interval with a current refresh time interval; and
   means for each said user selected internet web page, responsive to said current refresh time interval being different from said stored at least one refresh time interval, for updating said stored at least one refresh time interval.

16. A computer system as recited in claim 15 includes means responsive to said refreshed internet web page, for sending a message to a user.

17. A computer system as recited in claim 15 includes means for checking for a change in refresh default values and means for updating said stored page data responsive to an identified changed refresh default value.

18. A computer system as recited in claim 15 includes means responsive to said means for refreshing, for updating said stored at least one refresh time interval.

* * * * *